United States Patent Office 3,435,674
Patented Apr. 1, 1969

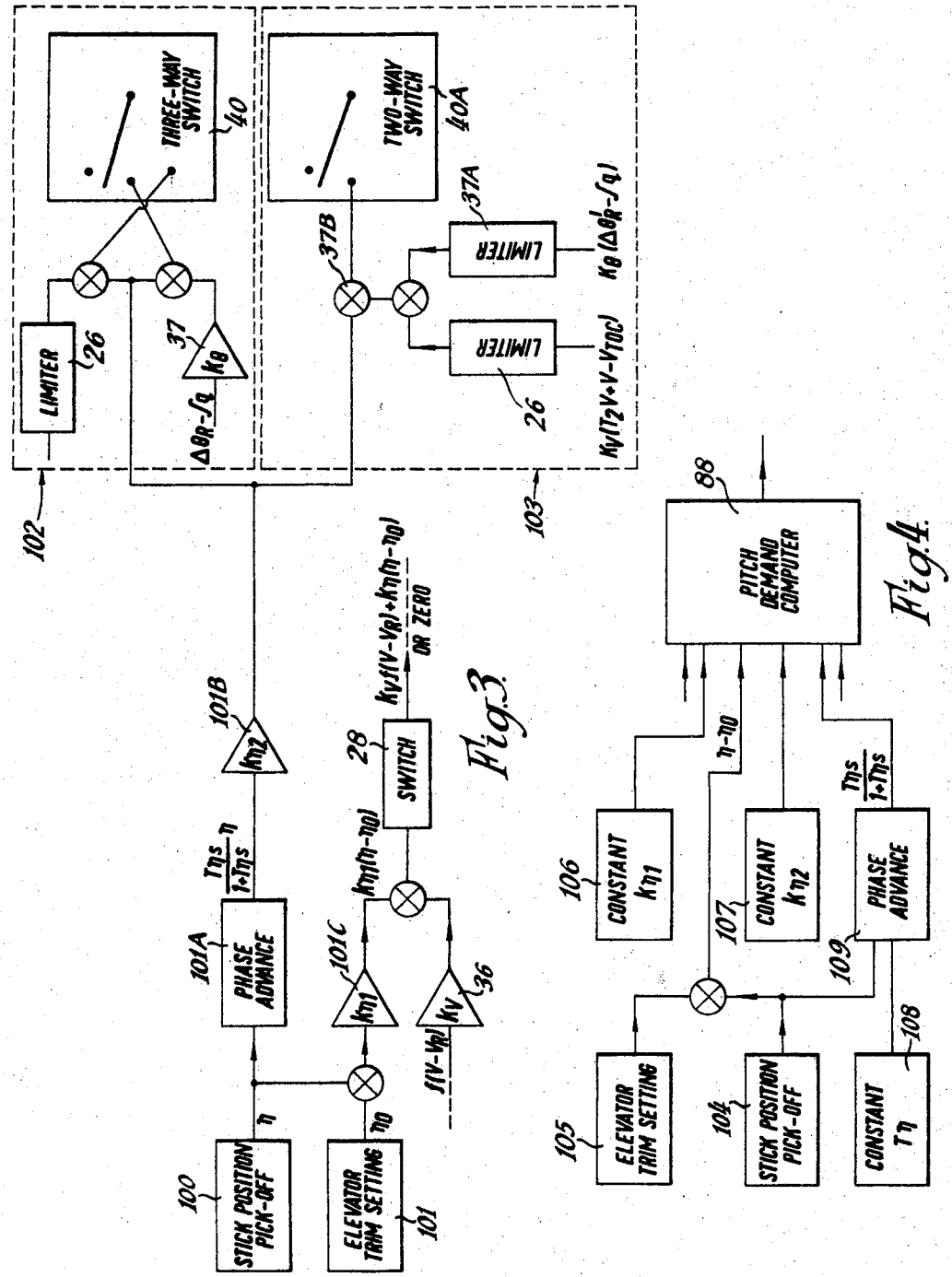

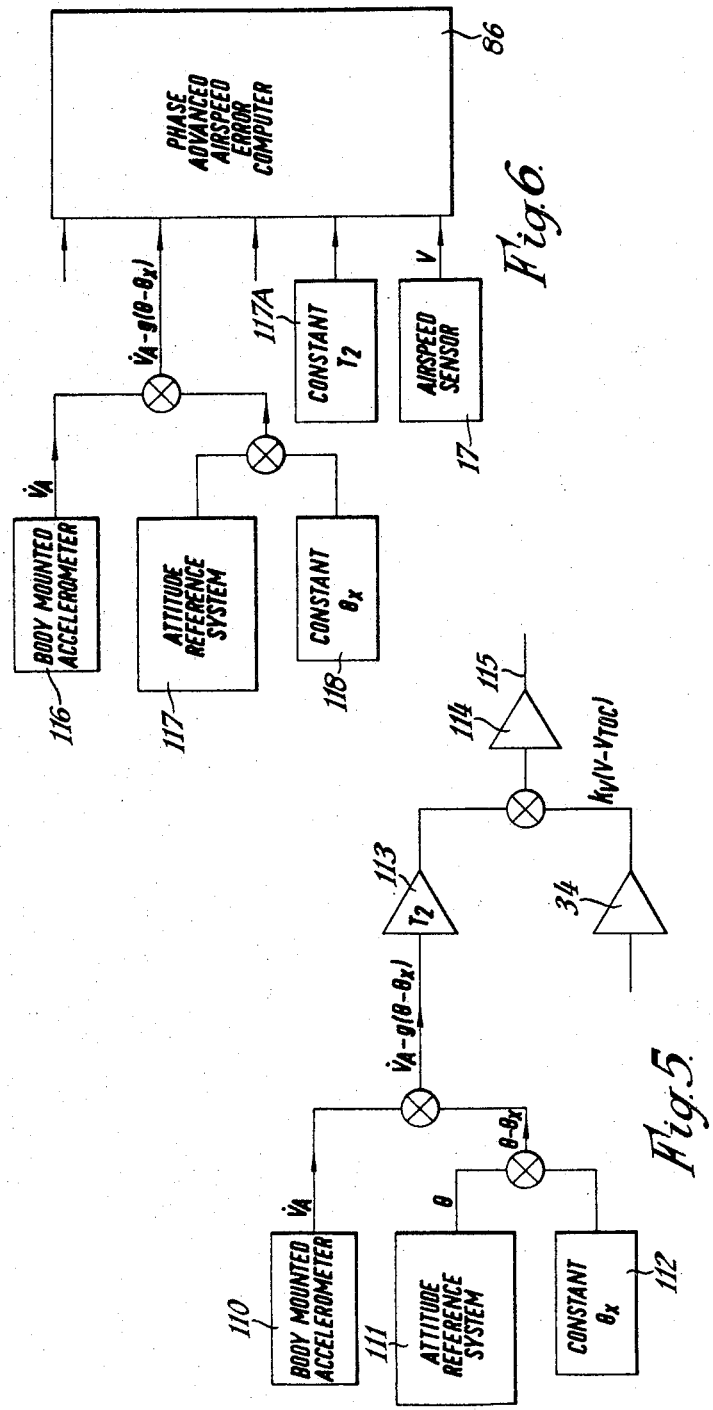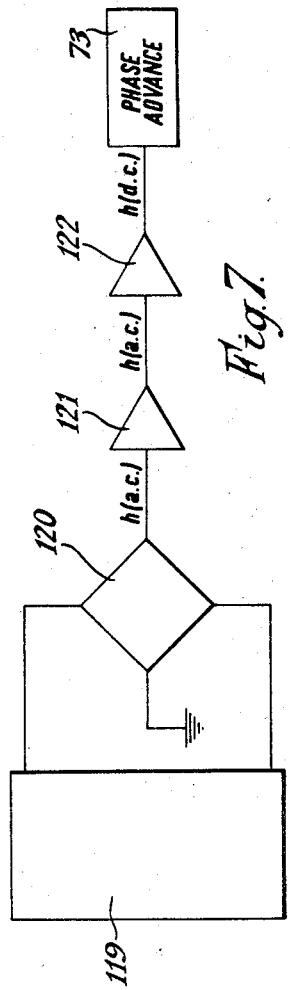

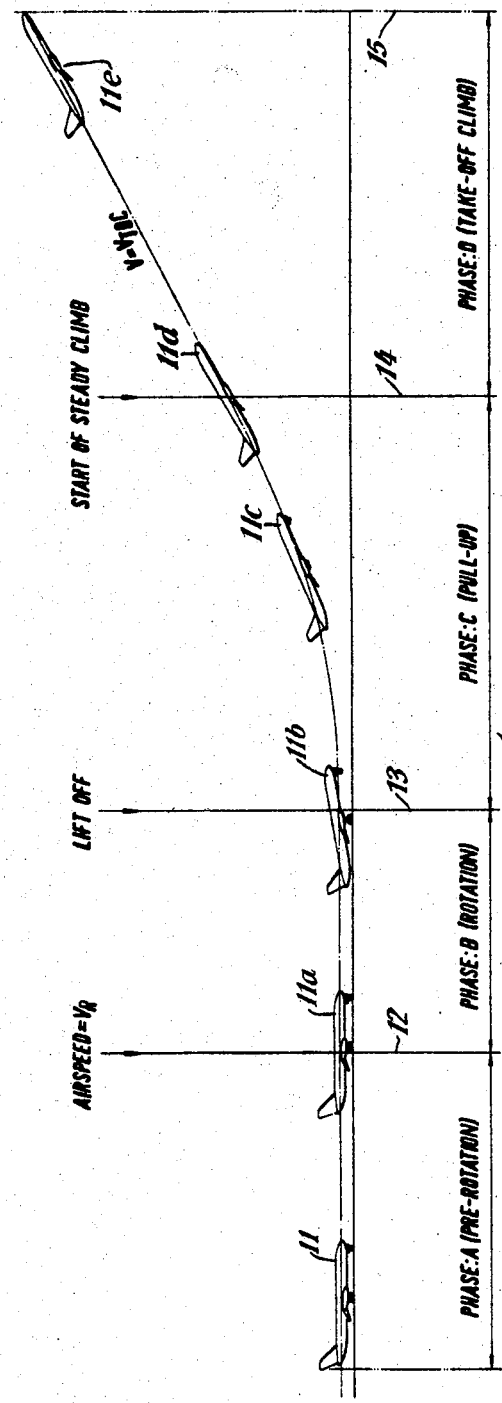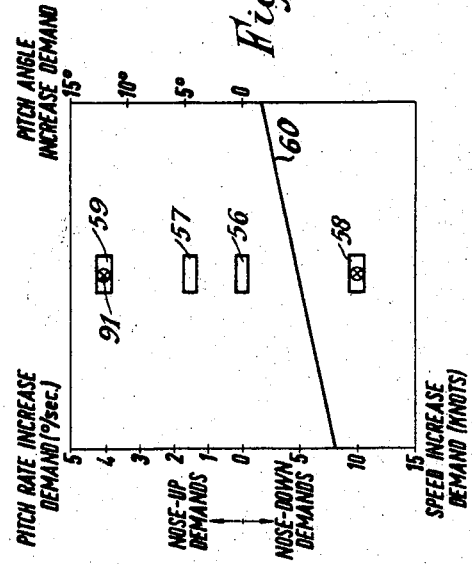

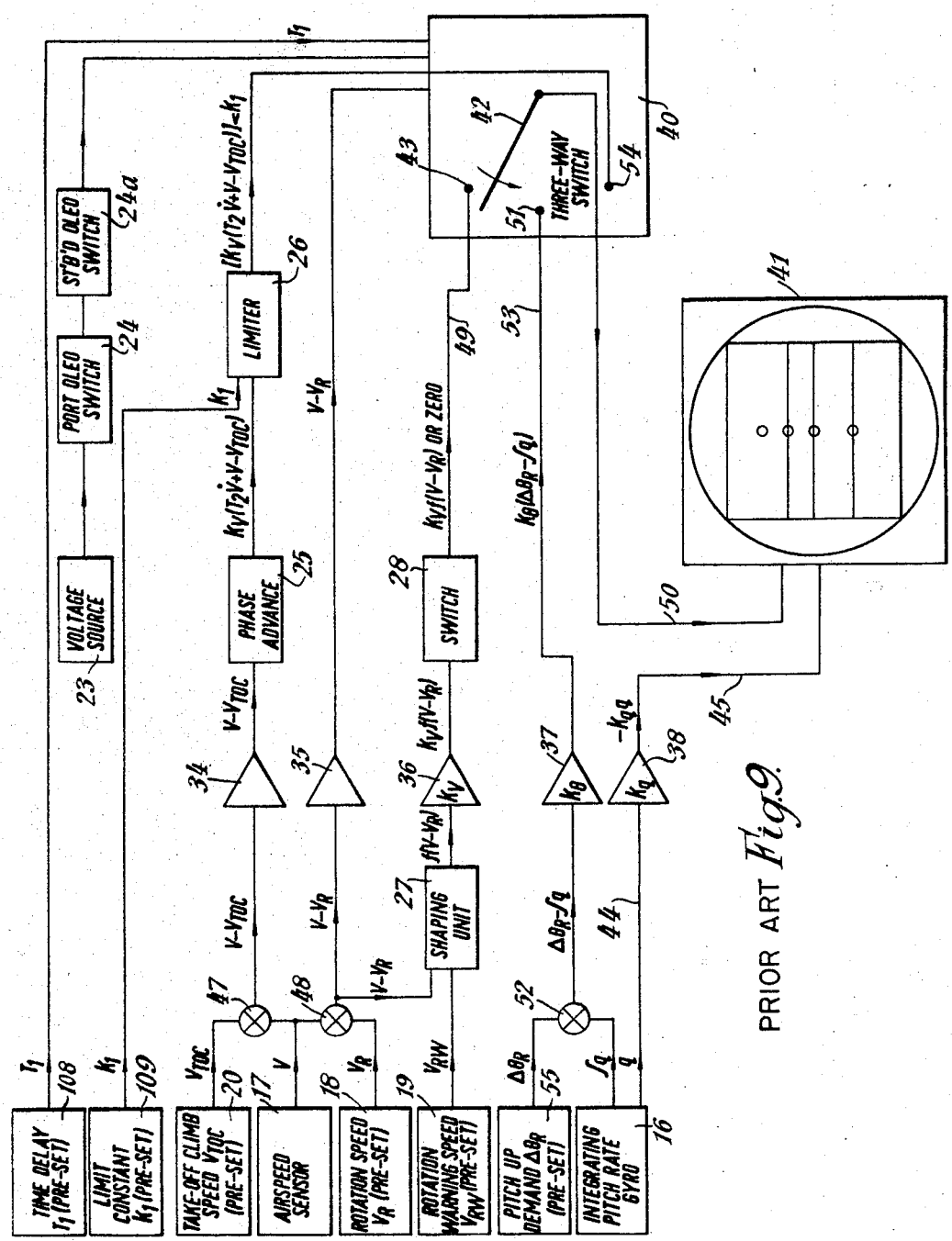
PRIOR ART Fig. 9

1

3,435,674
TAKE-OFF DIRECTOR SYSTEMS FOR AIRCRAFT
George R. Sleight and Michael I. Whitehouse, London, England, assignors to Elliott Brothers (London) Limited, London, England
Filed July 14, 1967, Ser. No. 653,555
Claims priority, application Great Britain, July 29, 1966, 34,263/66
Int. Cl. G01c 21/12
U.S. Cl. 73—178                  16 Claims

ABSTRACT OF THE DISCLOSURE

The invention relates to an aircraft director system for affording the pilot of an aircraft a continuous indication of the optimal action to be taken during the period of take-off and initial climb. It is also applicable to action to be taken in overshoot conditions and can be used to control an automatic pilot. The invention relates to improvements in the sequentially phased system described and claimed in United States Letters Patent No. 3,295,369 in which a visual indication is provided for the pilot and in particular provides a single demand signal for nose-up rotation and lift-off, feedback from the control column, an accelerometer to sense phase advanced airspeed and strain gauge means to provide a rate of climb signal and eventually a change of height signal.

---

Figure 1:
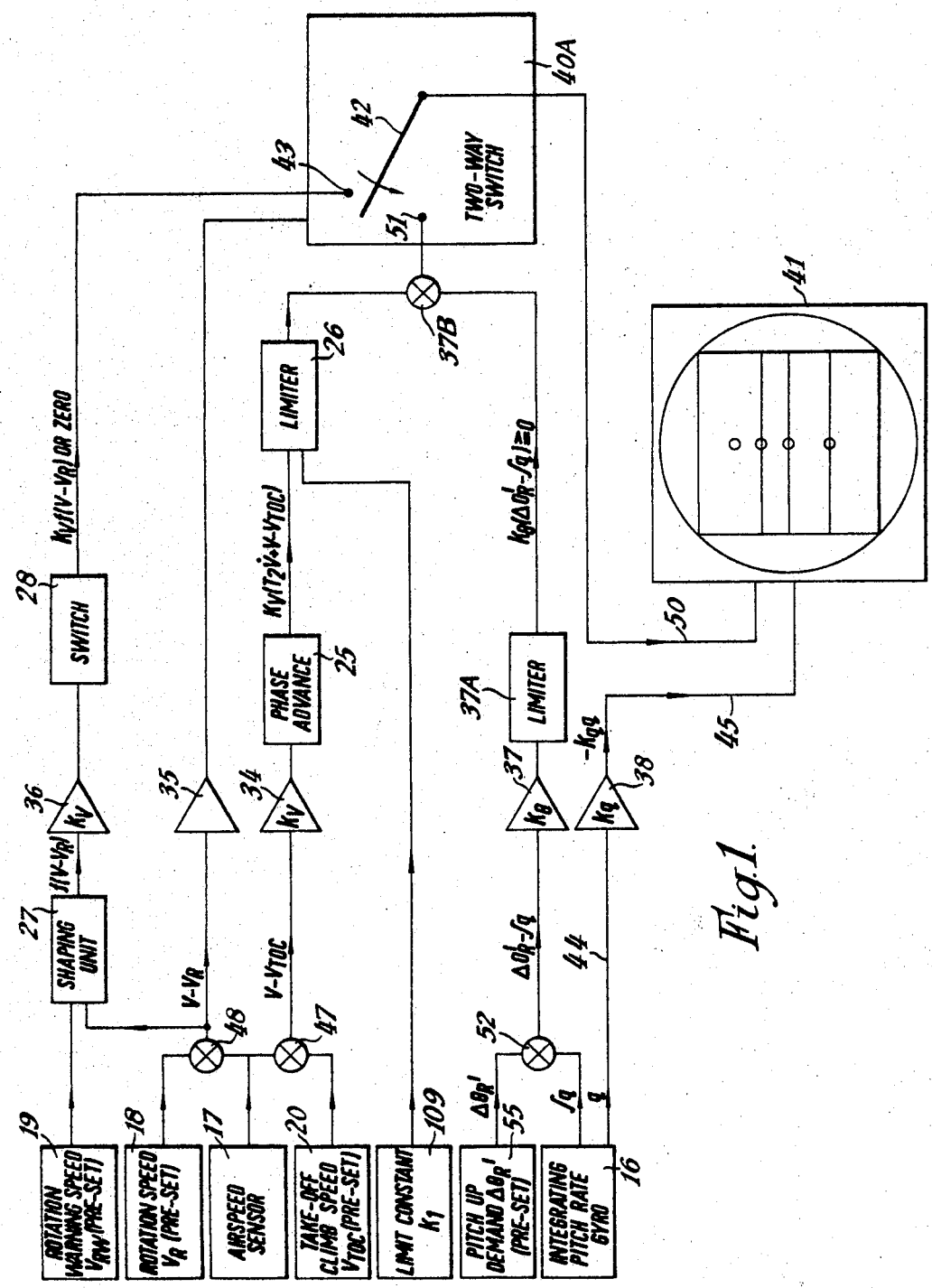

This invention relates to aircraft take-off director systems for affording to the pilot of an aircraft a continuous indication of the optimal action to be taken during the period of take-off and initial climb or overshoot or for controlling an automatic pilot.

In Letters Patent No. 3,295,369, issued Jan. 3, 1967, there is claimed a take-off director system for aircraft comprising means for continuously measuring selected components of the movement and position of the aircraft, such means comprising a pitch rate gyroscope having a rate output and an integrated rate output, and an airspeed sensor, means to generate signals representing constants dependent upon the characteristics of the aircraft, means to combine the measurements signals with the constants signals to provide a composite demand signal representative of the action required to perform the take-off and initial climb cycle in accordance with a predetermined program, and a director indicating instrument to display the composite signal so that the pilot, by setting the controls to carry out the demands displayed by the system, can perform the required sequence of take-off control operations in a substantially optimal manner.

Co-pending application No. 564,062, filed in the United States on July 11, 1966, describes a modification of this system including inter alia means capable of ensuring that a signal of demanded climb speed can be increased during the take-off of an aircraft but cannot be decreased during the take-off of an aircraft.

It is an object of the present invention to provide further modifications to and improvements in these director systems.

In particular the invention provides a single demand signal in the system for demanding nose-up rotation and for sensing lift-off. It also includes in the system feedback from the control column both before and after rotation. Phase advanced airspeed is sensed by the use of an accelerometer mounted on the body of the aircraft

2 and strain gauge means are used to provide a rate of climb signal from which a change of height signal can be derived.

In the examples of the invention described in the said Letters Patent No. 3,295,369 the demand signal representing the required sequence of control operations for take-off is varied in four sequential phases of the take-off and initial climb maneuver, with switching actions at the rotation speed $V_R$ and at the instant of lift-off. In particular the signal from $V_R$ to lift-off is $$K_\theta(\Delta\theta_R - \int q) - K_q q$$

and after lift-off $$[K_V(V^1 - V_{TOC})]_{<K_3} - K_q q$$

According to one aspect of the present invention the demand signal is substantially the same but the switching means associated with the oleo legs of the main undercarriage is eliminated. Thus the invention uses a single demand signal as from $V_R$:

$$K_\theta(\Delta\theta^1_R - \int q)_{\geq 0_1} + [K_V(V^1 - V_{TOC})]_{<K_3} - K_q q$$

By taking $$\Delta\theta^1_R = \Delta\theta_R - \frac{K_3}{K_\theta}$$

the same nose-up rotation $\Delta\theta_R$ is demanded at $V_R$ at the same initial rate $K_\theta/K_q \Delta\theta_R$ provided that the phase advanced speed term is on its $K_3$ limit, normally the case at $V_R$. Also, since by lift-off and thereafter $\int q$ exceeds $\Delta\theta^1_R$ under normal conditions, the term $$K_\theta(\Delta\theta^1_R - \int q) \geq 0$$

is zero, so that in the initial climb tho control law is effectively the same as before.

It therefore follows that this modified control law gives substantially the same performance, but with the following advantages.

The need for a switching mechanism sensing lift-off is avoided, and any possibility of a sudden jump in the demand signal at lift-off is eliminated. The change in the demand signal described in United States Patent No. 3,295,369 at lift-off should not normally be apparent to the pilot, but a discontinuity may occur if he has not been following the director closely.

In the event of an engine failure before lift-off, it may be that the phase advanced speed term will be less than its $K_3$ limit. In this event, a smaller nose-up rotation at a slower rate is demanded, so that the time for rotation is longer and gives the speed time to approach more nearly the four engine lift-off speed than would otherwise be the case with the reduced acceleration in engine failure cases.

Although the term $$K_\theta(\Delta\theta^1_R - \int q) > \theta$$

normally makes no contribution to the demand signal after lift-off, in the event of severe nose-down abuses when the pilot disregards the director system and reduces the pitch attitude of the aircraft to be less than $\Delta\theta^1_R$, the term then augments the pitch-up command made by the demand signal.

According to a second aspect, the control laws described in both the above earlier applications are modified to provide control column position feedback in the control system both before and after rotation. The control column position, $\eta$, preferably can be obtained from a pick-off in the pitch plane of the control column. Thus, according to this aspect, prior to rotation the demand signal becomes $$K_Vf(V-V_R) - K_qq + K_{\eta 1}(\eta-\eta_0)$$

wherein $\eta_0$ is the trim elevator position for rotation. The term $K_Vf(V-V_R)$ serves the same function as before, presenting a constant "nose-down" demand $$K_V(V_R-V_{RW})$$

prior to rotation warning speed $V_{RW}$, which thereafter reduces to zero by $V=V_R$. However this "nose-down" command can now be cancelled by pushing the control column forward by a definite amount (so that $$\eta-\eta_0 = \frac{K_V}{K_{\eta 1}}(V_R-V_{RW})$$

up to $V_{RW}$ and then releasing it to return to the trim position by $V=V_R$. $K_{\eta 1}$ needs to be big enough to ensure the aircraft is maintained "nose-down" before $V_R$, but not so big that the pilot has to apply an uncomfortably large push force.

The advantages of this extra term are that there is a closer control over what the pilot does with the control column up to rotation, and the $K_qq$ term can be omitted prior to $V_R$, in that if the pilot starts to rotate the aircraft early he will get a fly down signal from the $$K_{\eta 1}(\eta-\eta_0)$$

term which therefore serves the same function as the $K_qq$ term.

After rotation, a term $$K_{\eta 2}\frac{T\eta s}{1+T\eta s}\eta$$

is added to the control laws. (In the two earlier applications there are two control laws after $V_R$ with a switching at lift-off and in the above first aspect of the present invention a single control operates from $V_R$). This term is only sensitive to rates of movement of the control column and is independent of the steady position of the column in a trimmed condition. The sign of the term is such that a fly-up command will be reduced while the control column is pulled back. The effect of the term is to quicken the response of the demand signal to the pilot's control actions. In fact, with this term, the demand signal responds immediately to his actions instead of as formerly through the pitching response of the aircraft. The term also has the effect of restricting the speed with which control actions are executed.

According to a third improvement, also forming an aspect of the present invention, a means of obtaining phase advanced airspeed uses the output of a body mounted accelerometer. In Patent No. 3,295,369 and application No. 564,062 the phase-advanced airspeed is derived from a phase advance unit. In flight the body mounted accelerometer senses, in addition to aircraft forward acceleration, the components of gravity and normal acceleration along the axis of this accelerometer, and various angular accelerations. However, an acceleration signal suitable to form the phase advanced speed term for this particular application is obtained as follows:

(1) By siting the accelerometer at or near the aircraft e.g.;

(2) By including the accelerometer at an angle $\theta_X$ down from the fuselage datum so that in the steady climb out of the aircraft the accelerometer is approximately horizontal; and (3) By compensating the gravity component of the accelerometer output $g(\theta-\theta_X)$ using a pitch attitude reference from the attitude reference system.

According to a fourth aspect of the present invention, a rate of climb signal suitable for use in the take-off director system is derived from a zero length strain gauge pressure transducer and associated amplifier modules, in a manner described below.

Figure 2:
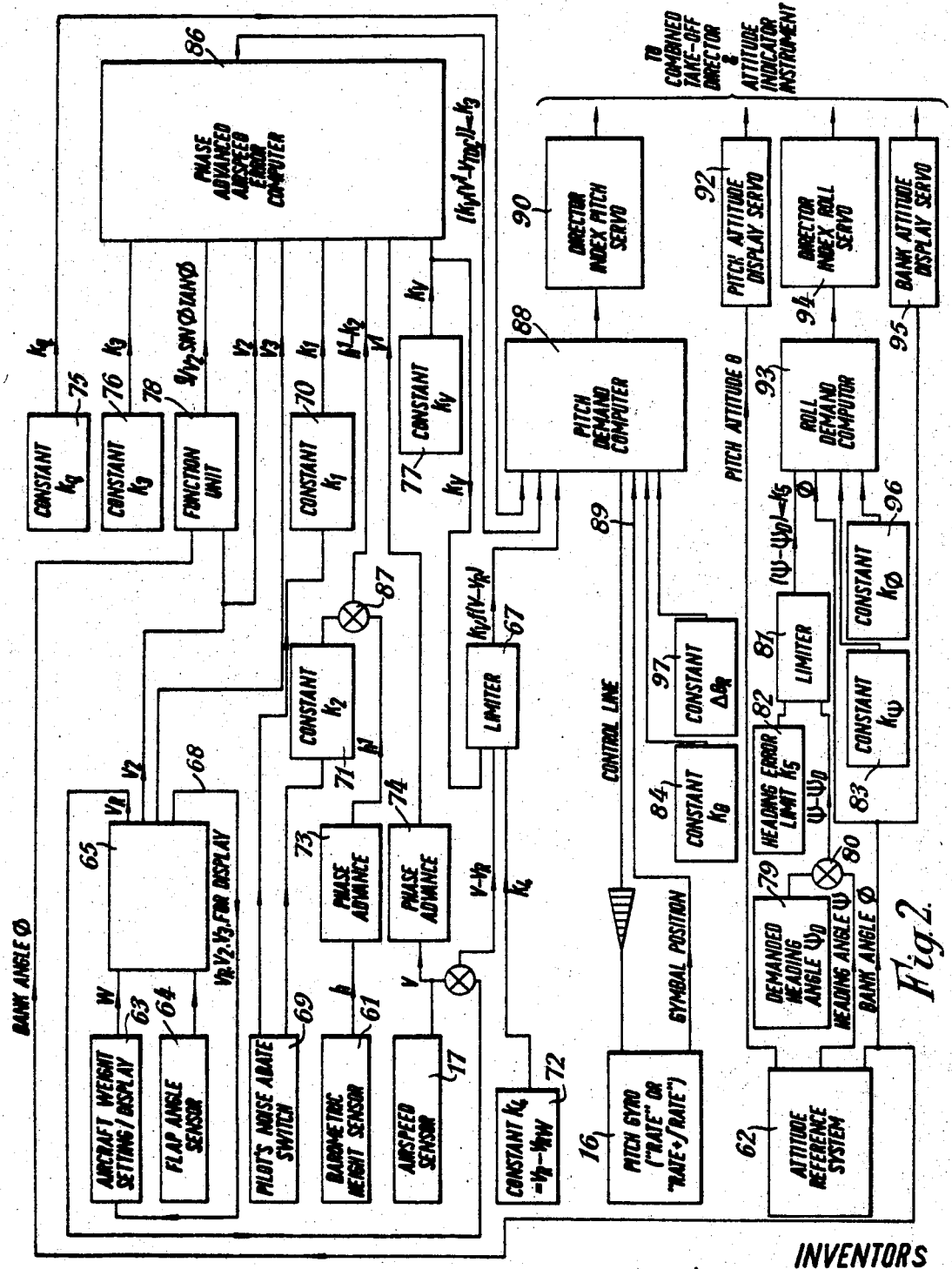

These aspects of the invention will now be further described by way of example with reference to the accompanying diagrams, in which:

FIGURES 1 and 2 show the modifications to FIGURES 2 and 3 of Patent No. 3,295,369 which are required for the elimination of the switching means associated with the main undercarriage oleo legs;

FIGURES 3 and 4 similarly show the modifications to the earlier FIGURES 2 and 3 necessary for the introduction of control column position feedback;

FIGURES 5 and 6 show the modifications required for obtaining phased-advanced airspeed using the output of a body mounted accelerometer. These two figures illustrate the necessary replacements for units 25 and 74 respectively in FIGURES 2 and 3 of Patent No. 3,295,369 and, FIGURE 7 shows the modifications necessary for the derivation of a rate of climb signal from a zero length strain gauge pressure transducer, the arrangement representing one form of replacement for the unit 61 in FIGURE 3 of Patent No. 3,295,369.

FIGURES 8 to 11 inclusive are FIGURES 1 to 4 of Patent No. 3,295,369 and are included for ready reference to assist in an understanding of the features of the present invention.

Referring to FIGURE 1, this figure has the same reference numerals as FIGURE 9. This embodiment of the present invention requires the following changes:

(1) The time delay unit 108 and the units 23, 24 and 24a shown in FIGURE 9 become redundant and are omitted;

(2) The three-way switch 40 in the earlier drawing becomes a two-way switch 40A in the present FIGURE 1;

(3) A new limiter unit 37A is added following the unit 37; and (4) A summing junction 37B is added after the two limiter units 26 and 37A.

Figure 10:
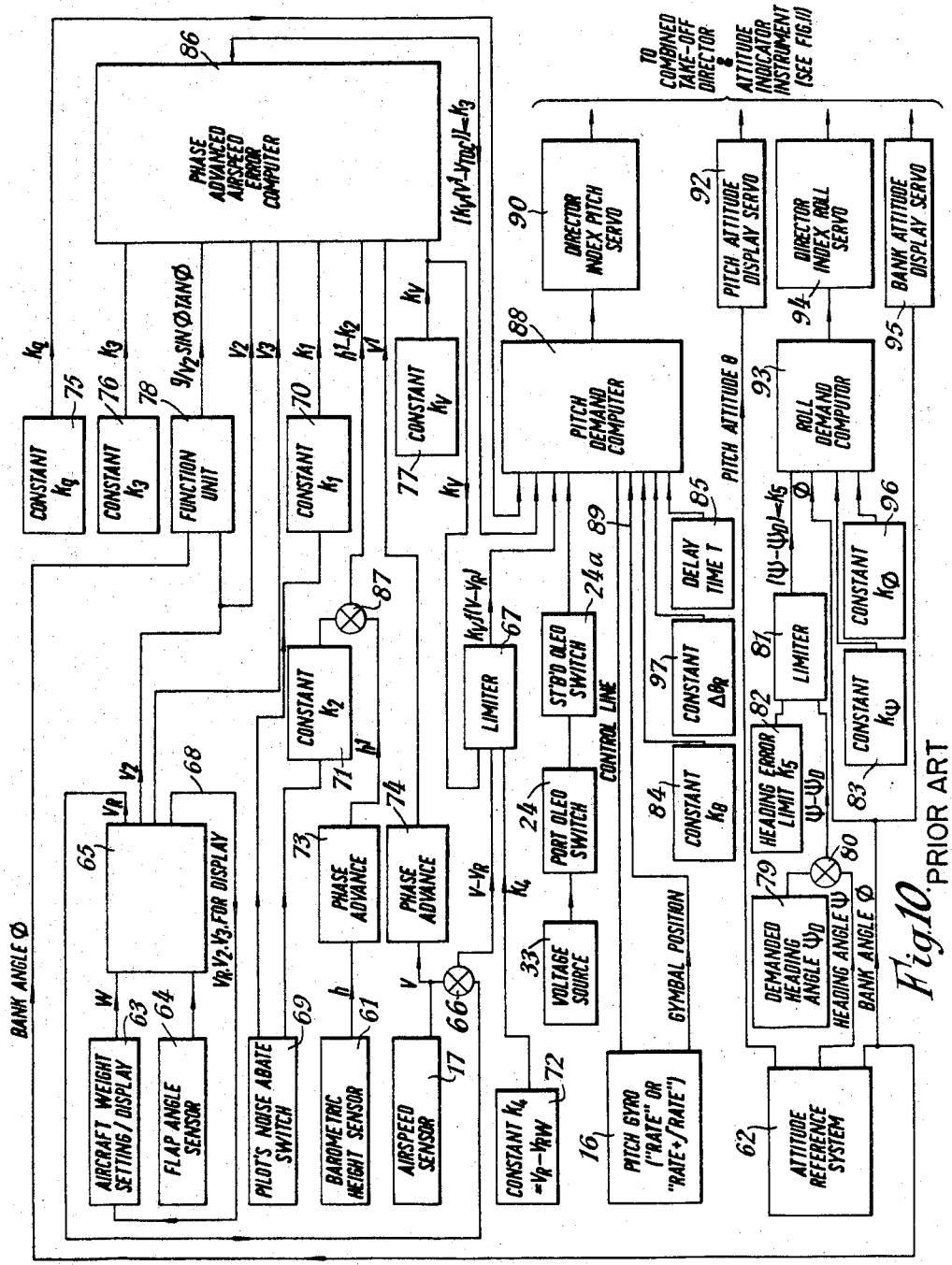

Similarly comparing FIGURE 2 of the present invention with FIGURE 10 the time delay unit 85 and the units 33, 24 and 24a of the earlier figure all become redundant and are omitted.

FIGURE 3 shows a control column position pick-off 100 an elevator trim setting unit 101, a phase advance unit 101A and amplifiers 101B and 101C all so arranged as to modify the control laws of FIGURE 9. The block diagrams enclosed in broken lines and generally indicated by the reference numerals 102 and 103 are alternatives. The former shows the relevant part of FIGURE 9 whilst the latter incorporates the modification shown in FIGURE 1 of the present application.

In FIGURE 4, a control column position pick-off 104, an elevator trim setting unit 105, units 106, 107 and 108 for introducing constants $K_{\eta 1}$, $K_{\eta 2}$ and $T\eta$ respectively and a phase advance unit 109 are all shown as additional units feeding into the pitch demand computer 88, this computer being that shown in FIGURE 9.

Referring now to FIGURE 5, the phase advance unit 25 shown in FIGURE 9 is replaced by a system consisting of a body mounted accelerometer 110, an attitude reference system 111, a unit 112 for introducing the constant $\theta_X$ and amplifiers 113 and 114. The load 115 is connected to the limiter unit 28 of FIGURE 9 and the amplifier 34 is the same as the amplifier 34 of this earlier application.

Similarly, FIGURE 6 shows a body mounted accelerometer 116, an attitude reference system 117 and a unit 118 introducing the constant $\theta_X$, all constituting a system replacing the phase advance unit 74 shown in FIGURE 10. This system feeds into the phase advanced airspeed error computer 86, also shown in the earlier figure, as does a unit 117A introducing a constant $T_2$ and a line from unit 17 shown in FIGURE 10.

FIGURE 7 shows a means of carrying out the fourth aspect of the invention, as referred to earlier. A power module 119 supplies a zero length strain gauge 120 so as to derive a barometric height signal. The output of the strain gauge is amplified in a filter amplifier 121 and converted to D.C. by a demodulator and filter module 122. Amplification is carried out using A.C. signals to avoid temperature drifts and to allow selective filtering which gives good signal to noise ratio and discrimination. The D.C. signal is fed to a D.C. blocking operational amplifier (specifying the phase advance unit 73, also shown in FIGURE 10 to obtain a pseudo rate of change of height signal, differing from a true rate signal by a small time constant applied to it, which is acceptable for this application. The above arrangement represents one form that can be taken by the unit 61 shown in FIGURE 10.

Advantages of the strain gauge over other pressure sensors are high reliability (it has no moving parts, and is of rugged construction), high resolution with a better signal to noise ratio than with a variable reluctance pick-off, and good frequency response. The disadvantage of a strain gauge, its long term drift, does not affect the system in this application, since the parameter finally required is rate of change of height.

We claim:

1. A director system for use in manoeuvring an aircraft comprising means for continuously generating signals representation of measurements of selected compronents of the movement and position of the aircraft, such means comprising a pitch rate gyroscope having a rate output and an integrated rate output, and an airspeed sensor, means to geenrate signals representing constants dependent upon the characteristics of the aircraft, means to combine the measurements signals with the constants signals to provide a composite demand signal representative of the action required to perform the manoeuvre in accordance with a predetermined program, said last mentioned means including means providing a single demand signal for demanding nose-up rotation and sensing lift-off, and a director indicating instrument for displaying the composite demand signal so that the pilot, by setting the controls to carry out the demands displayed by the system, can perform the required sequence of take-off control operations in a substantially optimal manner.

2. A system according to claim 1 wherein the said single demand signal is derived from a preset signal representative of the rotation speed of the aircraft.

3. A system according to claim 1 wherein the means for providing said single demand signal comprise a signal from said airspeed sensor and a preset signal representative of the rotation speed of the aircraft, means for combining said signals with a signal from said pitch rate gyroscope, a two-way switch operated by said combined signals and connecting said signals with said director indicating instrument.

4. A system according to claim 1 wherein the means for providing said single demand signal comprise a signal from said airspeed sensor and a preset signal representative of the difference between the said rotation speed and the approach of said rotation speed, means for combining said signals with a signal from said pitch rate gyroscope and means connecting said combined signals with said director indicating instrument.

5. A director system for use in the manoeuvring of an aircraft comprising means for continuously generating signals representative of measurements of selected components of the movement and position of the aircraft, such means comprising a pitch-rate gyroscope having a rate output and an integrated rate output and an airspeed sensor, means to generate signals representing constants dependent upon the characteristics of the aircraft, means to combine the measurements signals with the constants signals to provide a composite demand signal representative of the action required to perform the manoeuvre in accordance with a predetermined program, means for including control column position feedback in the control system both before and after rotation and a director indicating instrument for displaying the composite demand signal so that the pilot by setting the controls to carry out the demands displayed by the system can perform the required manoeuvre in a substantially optimal manner.

6. A system according to claim 5 wherein the said feedback is obtained from a pick-off located in the pitch plane of the control column.

7. A system according to claim 5 in which the measurements signals and the constants signals are such that the composite signal is representative of the action required to perform a take-off and initial climb cycle in accordance with a predetermined program.

8. A system according to claim 5 in which the measurements signals and the constants signals are such that the composite signal is representative of the action required to perform an overshoot operation in accordance with a predetermined program.

9. A director system for use in the manoeuvring of an aircraft comprising means for continuously generating signals representative of measurement of selected components of the movement and position of the aircraft, such means comprising a pitch rate gyroscope having a rate output and an integrated rate output an airspeed sensor, and an accelerometer mounted on the body of the aircraft sensing phase advanced airspeed, means to generate signals representing constants dependent upon the characteristics of the aircraft, means to combine the measurements signals with the constants signals to provide a composite demand signal representative of the action required to perform the manoeuvre in accordance with a predetermined program, and a director indicating instrument for displaying the composite demand signal so that the pilot by setting the controls to carry out the demands displayed by the system can perform the required manoeuvre in a substantially optimal manner.

10. A system according to claim 9 including an attitude reference system, wherein the accelerometer is mounted at or near the centre of gravity of the aircraft and is inclined at a downward angle from the fuselage datum so as to be approximately horizontal in steady climb, the gravity component of the accelerometer output being compensated by a pitch attitude reference from said attitude reference system.

11. A system according to claim 9 in which the measurements signals and the constants signals are such that the composite signal is representative of the action required to perform a take-off and initial climb cycle in accordance with a predetermined program.

12. A system according to claim 9 in which the measurements signals and the constants signals are such that the composite signal is representative of the action required to perform an overshoot operation in accordance with a predetermined program.

13. A director system for use in the manoeuvering of an aircraft comprising means for continuously generating signals representative of measurements of selected components of the movement and position of the aircraft, such means comprising a pitch rate gyroscope having a rate output and an integrated rate output, an airspeed sensor and strain gauge means to provide a rate of climb signal, means to generate signals representing constants dependent upon the characteristics of the aircraft, means to combine the measurements signals with the constants signals to provide a composite demand signal representative of the action required to perform the manoeuvre in accordance with a predetermined program, and a director indicating instrument for displaying the composite demand signal so that the pilot by setting the controls to carry out the demands displayed by the system can perform the manoeuvre in a substantially optimal manner.

14. A system according to calim 13 in which said strain gauge is mounted to provide a barometric height signal and means are provided for amplifying said signal, and for converting said amplified signal to direct current, said system including a phase advance unit to which said amplified direct current signal is applied to provide a change of height signal.

15. A system according to claim 13 in which the measurement signals and the constants signals are such that the composite signal is representative of the action required to perform a take-off and initial climb cycle in accordance with a predetermined program.

16. A system according to claim 13 in which the measurements signals and the constants signals are such that the composite signal is representative of the action required to perform an overshoot operation in accordance with a predetermined program.

References Cited
UNITED STATES PATENTS 3,295,369   1/1967   Priestley _____ 73—178

LOUIS R. PRINCE, *Primary Examiner.*

DONALD O. WOODIEL, *Assistant Examiner.*

U.S. Cl. X.R.

244—77